Nov. 22, 1932.    E. C. SCHACHT    1,888,410
LAMINATED ARTICLE
Filed March 11, 1932
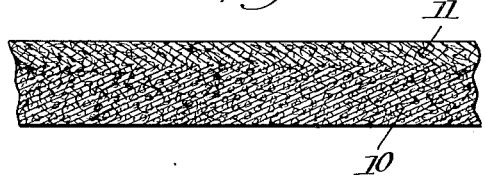
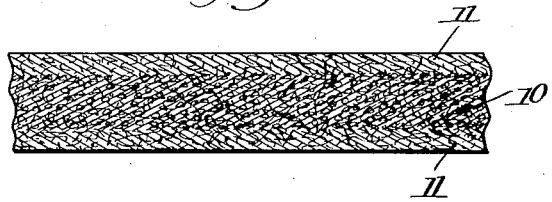

Patented Nov. 22, 1932

1,888,410

UNITED STATES PATENT OFFICE

ELMER C. SCHACHT, OF TROY, NEW YORK, ASSIGNOR TO BEHR-MANNING CORPORATION, OF TROY, NEW YORK, A CORPORATION OF MASSACHUSETTS

LAMINATED ARTICLE

Application filed March 11, 1932. Serial No. 598,285.

The present invention relates to sheet material having a laminated structure and adaptable for use in numerous applications such as artificial leather, floor coverings and gasket material.

The principal object of the invention is to produce a highly flexible stratified saturated web of any desired thickness which will consist of a flexible binder, a layer of fibres and a separator of comminuted cork, and another layer or layers bonded thereto and consisting substantially exclusively of fibres.

The completed article of the present invention comprises a laminated web of the structure just described, which will be saturated with a binder, whereby to render the web resistant to tearing, enable it to be sharply flexed without cracking while, at the same time, enhancing the resilience and compressibility.

Essentially the present invention comprises a laminated web in which the layers consist, respectively, of a mixture of comminuted cork and fibres, and fibres exclusively, and wherein, as stated, the layers are felted together and are permanently saturated with a flexible binder.

A further object of the invention is to employ a flexible binder which will re-act or co-operate with the sheet to produce the aforementioned results, and which also will be permanently and insolubly incorporated in the sheet. Thus, a flexible binder will be selected in accordance with the use to which the article is intended, and which will be resistant to the action of moisture, as well as organic and inorganic solvents, or any one of such conditions.

Another object is to employ a flexible binder of a character that a coating may be satisfactorily applied or formed upon the sheet to produce coated products such as artificial leather or floor coverings.

Referring to the drawing:

Figure 1 is a section of the sheet material illustrating diagrammatically a facing layer and a body layer, the thickness of the respective layers, however, being variable in accordance with the product desired.

Figure 2 is a sectional view of a modification in which a core and two facing layers are diagrammatically shown, it being understood also that thickness of the core and the facing layers with respect to each other may be varied at will.

The layer 10 preferably comprises a web or sheet-like structure composed of a separator, i. e. comminuted cork and fibres as described in my allowed copending application, Serial No. 581,511, filed Dec. 16, 1931.

The separator is comminuted cork which should be of a size which may be termed "effective". That is to say, the cork granules to be effective should not exceed, in cross-section, the desired thickness of the finished sheet, nor should they be smaller in cross-section than the cross-sectional diameter of the fibres. Finer cork than this will act as a filler, thereby preventing the formation of voids and air cells, and also will be lost to a larger extent in the paper making process; likewise smaller particles would be ineffective in acting as separators and hinges about which the fibres can flex. I have used successfully cork particles of a grade from 50 to 150 mesh and 30 to 50 mesh.

In referring to fibres with which the cork particles are mixed to form the web 10, these should be long enough to contribute tearing strength to the finished product, long enough to mesh and hold the "separating" particles, i. e., the cork, and long enough to make an absorbent paper, quickly permeable to saturating solutions. Specific examples of the fibres which I employ are:

Jute,
Rope,
Hemp,
Sisal,
Kraft pulp fibres,
Long wood pulp fibres,
Absorbent alpha cellulose,
Wood pulp fibres,
Cotton,
Linen,
Asbestos.

In the manufacture of the web 10, I prefer to use comminuted cork and long fibres from the group above recited.

In forming the web, the materials are preferably prepared as a pulp by typical paper making operation of mixing and beating them together and running the mixture on a multiple Fourdrinier or cylinder paper making machine to produce a continuously formed paper-like web of the desired thickness.

Referring again to the drawing, I have indicated a web or layer 11 bonded to the layer 10. This web 11 is preferably composed exclusively of fibres from the group above recited. On the other hand, I may use either long or short fibres or a mixture thereof in producing the layer 11.

The method of manufacturing the composite web is described in a copending application Serial No. 606,725, filed April 21, 1932, and is preferably accomplished in a suitable cylinder or multiple Fourdrinier paper making machine, whereby I am enabled to simultaneously form both layers 10 and 11 and felt them together in a single operation to produce a substantially integral laminated structure.

Referring to the drawing, it will be observed that the fibres of the respective layers are interlaced so that the layers are united in substantially the same manner as paper is conventionally made on a cylinder or multiple Fourdrinier machine.

In this manner, the thickness of the respective layers may be controlled in accordance with the thickness of the ultimate product, and while preferably the cork and fibre web layer will be thicker than the fibre web, in some cases this relationship will be reversed or both layers will have the same thickness.

Also, I have illustrated in the drawing the web 10 as forming the base and the layer 11 as forming a facing for one or both sides of the base. I also use a structure wherein, instead of the cork and fibre mixture constituting the base, the web composed exclusively of fibres will constitute the base and similarly also will constitute the core in lieu of the construction illustrated in Figure 2, whence the cork and fibre mixture will be formed as a facing for one or both sides of the base or core.

The construction so far described, comprising, respectively, a layer of cork and fibres and a layer composed exclusively of fibres bonded thereto, is possessed of a considerable degree of compressibility and rebound. However, such composite product is substantially brittle and has no appreciable resistance to tearing.

It will be understood that the facing layer or layers will be relatively thin, but, of course, may be of any desired thickness, and the same is true with respect to the layer of cork and fibre. The thickness of the respective layers will vary in accordance with the product required, and the illustrations in the drawing are purely diagrammatic.

The web, moreover, is characterized by having innumerable air cells and voids, due to the interlaced relation of the cork and fibres and the porous nature of the layer composed exclusively of fibres. Hence, the web exerts a capillary effect which is exceedingly important in producing a permeation with a suitable saturant.

In order to render the web of increased tensile strength and to render it pliable and flexible, so that it may be subjected to sharp creasing without developing cracks, and whereby its inherent brittleness is overcome, I resort to the use of a saturant which not only modifies the web to obtain these desirable results, but, furthermore, enhances the compressibility and rebound.

The saturant employed will preferably be a flexible binder. The type of service for which the resulting saturated product is intended, will determine the choice of the binder. That is, a binder will be selected having the modifying characteristics which are desired in the finished sheet. For example, a highly waterproof product can be produced by the use of rubber latex or modified bakelite resins, while resistance to mineral oils will be accomplished by treating with tanned, plasticized, glutinous adhesives.

By "flexible binder", I mean a binder and a plasticizer, or a binder which has both an adhesive function and the function of a plasticizer.

Examples are glutinous adhesives, such as casein, hide, bone, albuminous and similar glues capable of being rendered insoluble, and which can be treated or tanned so as to become permanently and insolubly incorporated in the structure of the sheet.

As tanning agents, I resort to one or more of such materials as formaldehyde, paraformaldehyde, hexamethylenetetramine and sodium bichromate. In connection with the glutinous binder and tanning agent, I utilize plasticizers of which glycerine, sulphonated castor oil, diethylene glycol, and aquaresin, are examples. Thus, I employ a plasticized adhesive or binder, and I find that with such a saturant the laminated structure is strengthened, so as to be resistant to tearing, is rendered flexible, in that it will not crack under sharp creasing or folding and is pliable, in that regardless of the degree of flexing, to which it is subjected, it will return to its normal sheet-like condition without noticeable creases or any indication of the lines of bending. Moreover, such saturant being permanently and insolubly incorporated throughout the cellular structure of the laminated web not only lends a resilience or pliability to the sheet, but enhances, to a remarkable degree, the inherent compressibility and rebound.

Further examples are natural or synthetic resins of which innumerable varieties are commercially available and which may be treated by conventional processes and with modifying agents as understood in the art, to impart the necessary flexibility and elastic characteristics.

Of the natural resins, I resort to Kaouri and copal resins, as well as modified Chinawood oil, and of synthetic resins, I find those of the alkyd, furfural, and phenol-formaldehyde type, such as bakelite are very acceptable, as well as "polymerized isoprene" and chlorinated rubber.

These resinous plasticized binders afford the same results obtained with those of the first class above mentioned, in that the sheet will be strengthened, its inherent brittleness replaced by a flexibility resistant to sharp creasing and folding, and the compressibility and rebound not only will not be disturbed, but will be made effective to a greater degree.

In addition to the plasticized adhesives which have been recited, I also employ rubber in the form of latex, and I prefer to use a vulcanized latex or a mixture of rubber latex and an agent, such as sodium polysulfide. In order to prolong the useful life of the product, an antioxident, such as pheno-alpha-naphthylamine and phenyl-beta-naphthylamine, may form a part of the latex treatment and, in some cases, I use a suitable vulcanizing agent with or without an accelerator.

Of the flexible plasticized adhesives above mentioned, it will be observed that many of them, such as the glutinous and resin binders are not only resistant to moisture, but are, moreover, inert with respect to various organic and inorganic solvents, of which mineral oils and distillates are examples.

I employ the various saturants or plasticized binders in accordance with the use for which the article is intended. In gasket materials it is essential that the article be resistant to water or mineral oils and distillates. In the manufacture of artificial leather, as well as floor coverings comparable with linoleum and artificial linoleum, it is essential, in most cases, that the article be moisture resistant.

Thus the finished web when permeated with rubber latex, for example, will produce a flexible floor covering not affected by water. If a synthetic resin saturant be employed, a flexible waterproof sheet highly efficient for artificial leather is obtained. In the manufacture of gasket material the tanned plasticized glue is very acceptable, and the product, while hydroscopic, will not disintegrate in water, and is very resistant to mineral oils and distillates.

With respect to the saturating treatment, this may be accomplished in a variety of ways. The saturants may be incorporated in the vats on the paper machine or in the beater. Also, the saturants may be premixed with the fibre and comminuted cork before passage to the beater.

The preferred method is to pass the completed web through a bath of saturating materials. As a further modification, a combination of these two aforementioned permeating methods may be employed. For example, by the addition of one modifying agent before or during the paper-making process to be followed by subsequent saturation of the completed web with the same agent or a different one.

I prefer to use a saturating bath through which the completed web is passed from the paper making machine, but I mention all of the above modifications of the process so that it will be clear that the saturant may be incorporated prior to or during formation of the sheet, as well as after the sheet has been formed.

In forming the web it is preferably prepared after the manner of the usual paper making processes, and may or may not be calendered as desired. The web so formed may be dried, and wound up into rolls or passed immediately to the saturating bath.

It will, moreover, be understood that in the use of binders employing a glutinous adhesive, that a drying operation alone will be required, but where resins are employed, it is usually necessary to present the sheet to heat or heat and pressure so as to cure such resins in the sheet. The same is true generally with respect to the rubber treated sheet, which is preferably given a heating treatment.

The use of a facing layer formed exclusively of fibres provides a smooth surface without calendering and which will take an appropriate coating and enable a nice finish to be secured.

The saturated laminated product having its layers substantially integral with each other, may have applied to one or both surfaces thereof, any suitable coating, as by spraying, spreading, brushing or immersion.

By reason of the pliability and resiliency or plasticity of the web, it forms an excellent base for such plastic and flexible coatings as cellulose lacquers and paints, of which there are innumerable commercial varieties available. Such lacquers utilize, as a base, a cellulose derivative, such as cellulose nitrate or cellulose acetate, together with a gum and a plasticizer, and the present sheet material will cooperate with such a coating to prevent cracking of the coating film. I will also employ Chinawood oil varnishes and linseed oil varnishes which likewise are flexible and of which a number of commercial varieties are obtainable.

Furthermore, all of the flexible binders will enable cellulose derivative or varnish coatings and films to be applied to the sheet without difficulty.

In the case of artificial leather, I utilize coatings of pyroxylin, alkyd resins and similar substances which will produce the desired surface, and these, by reason of the flexible and resilient character of my laminated base, will be prevented from cracking or scarring in use.

In the manufacture of floor coverings, such as linoleum and artificial linoleum, I employ the varnishes and lacquers above mentioned, with equal success since the elastic and flexible nature of the coatings will be retained because of the flexiblity and resilience of the laminated base.

The product of this invention has the characteristics of high flexibility and compressibility which are present in the product of my companion application hereinbefore mentioned. Furthermore, by reason of the provision of a facing layer consisting solely of fibre, there results a product which is particularly useful in receiving finishing coatings on the fibre facing. I am aware that it has heretofore been suggested to produce a non-saturated cork and fibre material having one or both surfaces thereof faced with a layer consisting solely of fibres, but I have discovered that the saturation or permeation of such a product not only produces the results described in my copending application with reference to a non-laminated product, but also affords a means for providing an improved product adapted to receive a finishing coating. Some saturants, such as rubber, interfere with the application of certain finishing coatings, and it has been found that, in some instances, this is particularly objectionable in connection with a cork fibre product, due to the presence of the large amount of saturant in the cork fibre material. However, the fibre facing layer when applied to the cork fibre may be readily regulated in characteristics which affect the condition of its surface intended to receive a finish coating. For example, it may be regulated as to density, as by selection of proper fibres or control of the period of working the mass in the beater. This permits the permeation thereof by the binder to be reduced to a minimum or otherwise regulated by controlling the density of the fibre layer. Again the condition of the surface of the fibre facing layer, as well as the condition of its body, may be varied as desired in any other respects independently of the cork fibre layer, since its mass is prepared and may even receive its binder, in whole or in part, separately from the cork fibre layer, as described. The combination, therefore, of the fibre layer with the cork fibre layer in a product saturated with a binder, enables me to produce a surface which may receive a finish unimpaired in character by the saturant or binder, regardless of the nature of the finish or of the saturant. For example, if the finish to be applied is one which does not coact well with the binder, the fibre facing may be made very dense, so that it has a very small amount of the saturant therein, or may be separately impregnated, e. g., in the beater or by premixing with a binder harmonious with the finishing material, as well as with the binder of the cork fibre layer. On the other hand, if the finish to be applied is one which is improved by or is compatible with the binder, a fibre facing less dense than in the former instance may be utilized and having a proportionately increased amount of saturant therein. In any event, a fibre facing denser than the cork fibre layer is usually preferred.

The present invention is characterized by toughness, i. e., great tensile strength and resistance to tearing. It is further compressible to a remarkable degree, in fact more compressible than the untreated laminated sheet. Moreover, its pliability and flexibility are such that it may be sharply creased or folded without fear of producing permanent cracks and lines of fold.

It will be understood that the facing layer 11 forms a smooth surface which may be readily coated, and that if desired, this layer may be subjected to a calendering to obtain a very high finish.

As a further embodiment of the invention, I may apply to one or both sides of the saturated integral laminated web of this invention, a layer of preformed material, such as a cloth, fabric or paper, and which will either be bonded to the laminated web by a separate adhesive or united thereto by the binder with which the web is permeated. Preferably, this backing of fabric, paper or other preformed material will be applied to one surface only. If desired, the preformed layer may be united to the web immediately after the latter has assumed its form and then the entire laminated structure given a saturating treatment with the plasticized binder.

As a further modification of the invention, I may form one layer of a major portion of cork granules with just sufficient fibres to produce an interlaced structure to which the layer of fibres may be felted and the fabric backing or other preformed material may be united to the same as described.

I claim:

1. Resilient and flexible sheet material having a web formed of a body mass consisting of comminuted cork and fibres in interlaced relation; a paper-like web adapted to receive a finishing material and formed of a body mass consisting of fibres felted to said first web and forming therewith a substantially integral laminated sheet, and a flexible binder permanently incorporated in the sheet throughout both webs.

2. Resilient and flexible sheet material having a web formed of a body mass consisting of comminuted cork and fibres in interlaced relation, a paper-like web adapted to receive a finishing material and formed of a body mass consisting of fibres felted to said first web and forming therewith a substantially integral laminated sheet, and a flexible binder permanently incorporated in the sheet throughout both webs, said binder being insoluble in water.

3. Resilient and flexible sheet material having a web formed of a body mass consisting of comminuted cork and fibres in interlaced relation, a paper-like web adapted to receive a finishing material and formed of a body mass consisting of fibres felted to said first web and forming therewith a substantially integral laminated sheet, and a waterproof flexible glutinous binder permanently incorporated in the sheet throughout both webs.

4. Resilient and flexible sheet material having a web formed of a body mass consisting of comminuted cork and fibres in interlaced relation, a paper-like web adapted to receive a finishing material and formed of a body mass consisting of fibres felted to said first web and forming therewith a substantially integral laminated sheet, a waterproof flexible glutinous binder permanently incorporated in the sheet throughout both webs, and a plasticizer.

5. Resilient and flexible sheet material having a web formed of a body mass consisting of comminuted cork and fibres in interlaced relation, a paper-like web adapted to receive a finishing material and formed of a body mass consisting of fibres felted to said first web and forming therewith a substantially integral laminated sheet, and a formaldehyde treated glutinous adhesive and a plasticizer permanently incorporated in the sheet through both webs.

6. Resilient and flexible sheet material having a web formed of a body mass consisting of comminuted cork and fibres in interlaced relation, a paper-like web adapted to receive a finishing material and formed of a body mass consisting of fibres felted to said first web and forming therewith a substantially integral laminated sheet, and a flexible binder permanently incorporated in the sheet throughout both webs, said binder being insoluble in water and mineral oil.

In testimony whereof I affix my signature.

ELMER C. SCHACHT.